Figure 1:
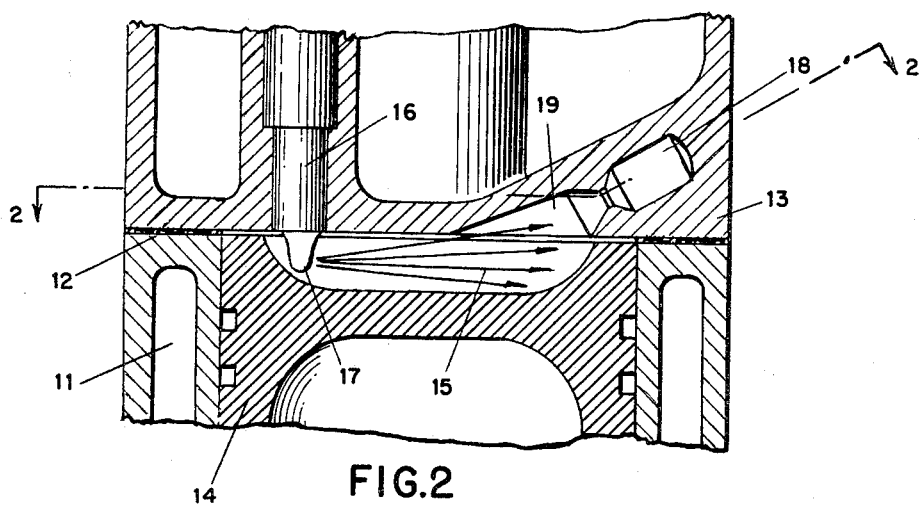

Nov. 8, 1955  H. LANG  2,722,921

INTERNAL COMBUSTION ENGINE

Filed Aug. 28, 1951  2 Sheets-Sheet 1

INVENTOR
Heinrich Lang
BY
ATTORNEY

Nov. 8, 1955 H. LANG 2,722,921
INTERNAL COMBUSTION ENGINE
Filed Aug. 28, 1951 2 Sheets-Sheet 2

INVENTOR.
Heinrich Lang
BY
ATTORNEY

United States Patent Office 2,722,921
Patented Nov. 8, 1955

2,722,921

INTERNAL COMBUSTION ENGINE

Heinrich Lang, Munich, Germany

Application August 28, 1951, Serial No. 244,046

Claims priority, application Switzerland September 6, 1950

4 Claims. (Cl. 123—32)

My invention relates to internal combustion engines and more particularly to internal combustion engines comprising one or more energy cells.

Such engines are constructed and operate as follows: The energy cell, which adjoins the combustion space and opens into the same with a narrow throat, is located directly opposite the throat of the injection nozzle. During the compression stroke air at high pressure is forced into the energy cell; because of the pressure drop caused by the restricted throat, the air reaching the energy cell is, however, at lower pressure than is the air in the combustion space. Shortly before the compression stroke is completed a stream of fuel is injected into and travels across the combustion space toward the throat leading into the energy cell. Since the compression stroke still continues, some air is still being forced into the energy cell and this air carries with it a portion of the fuel charge. The pressure in the energy cell remains lower than that of the combustion space for the reason stated above. When ignition of the fuel-air mixture occurs in the combustion space shortly before the end of the compression stroke a first flame appears on the surface of the stream of the injected fuel and this flame propagates into the energy cell igniting the fuel-air mixture therein. This burning mixture in the energy cell almost instantaneously builds up a very high pressure of say about 1400 lb. per sq. in. while the pressure in the combustion space is much lower and only slightly higher than the final compression pressure of say about 600 lb. per sq. in. The great difference of these pressures causes a violent ejection of the burned or burning mixture from the energy cell into the combustion space and results in a thorough mixing of the fuel and air in the combustion space causing a rapid and complete burning of the same.

In such engines as heretofore generally constructed the working of the energy cell or cells was not always reliable as quite often the fuel injected into the combustion chamber did not penetrate in sufficient amounts into said cell or cells.

The main object of my invention is to overcome the said deficiencies and this is achieved by the arrangement of a troughlike combustion chamber in the crown of the engine piston into which chamber extends the laterally spraying tip of the injection nozzle mounted in the cylinder head with its axis at least approximately parallel to the cylinder axis eccentrically thereto and by arranging the energy cell or cells diametrically opposite to said injection nozzle with its or their axes inclined toward the cylinder axis and its or their mouths directed against the said tip of said nozzle.

These and other objects of my invention will be more fully understood from the following specification when read with the accompanying drawing in which three embodiments of my invention are illustrated.

In the drawing

Figure 2:
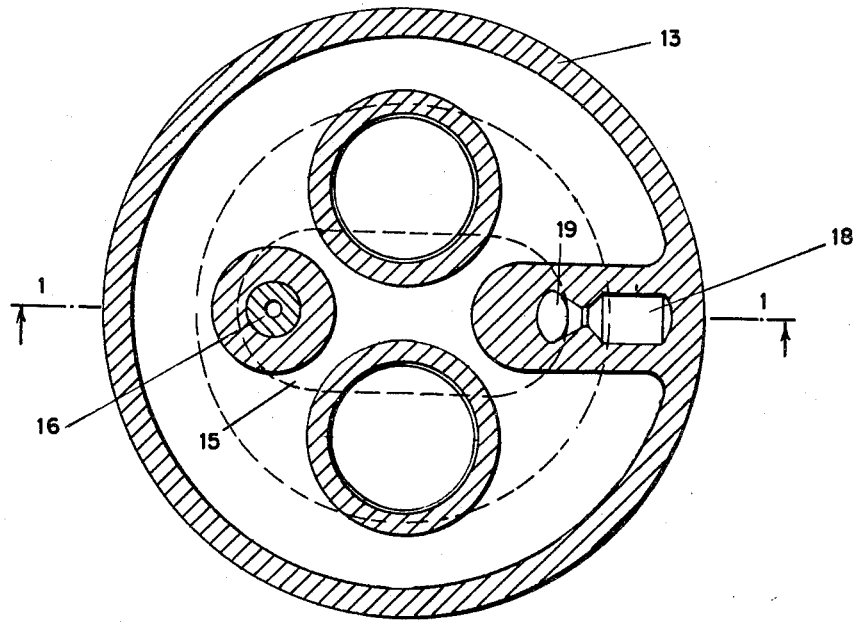
Figure 3:
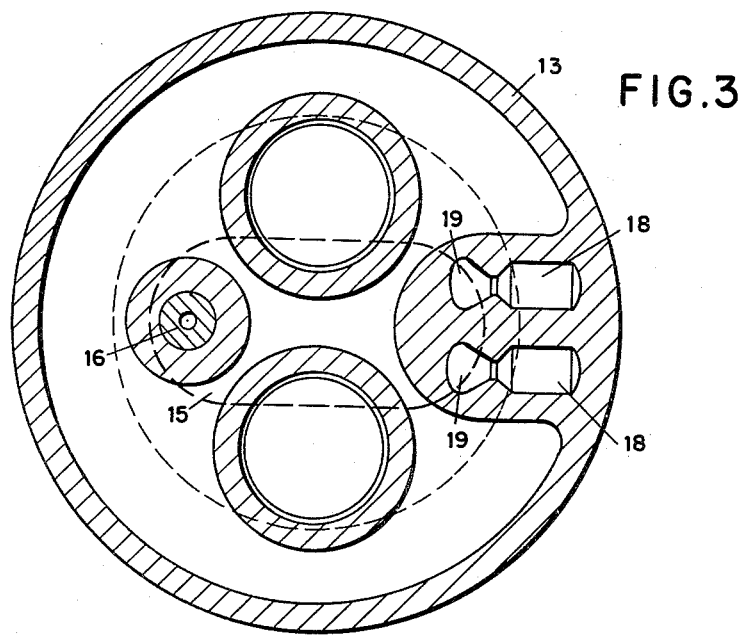
Figure 4:
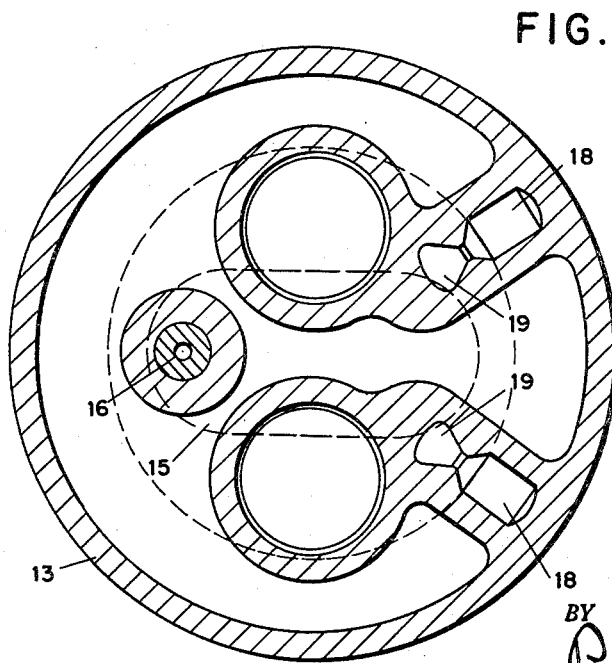

Fig. 1 shows one embodiment of my invention in a longitudinal sectional view taken along line 1—1 of Fig. 2, Fig. 2 shows a cross section thereof taken along line 2—2 in Fig. 1, and Figs. 3 and 4 show similar cross sections of two modified embodiments of my invention, respectively.

The same reference characters indicate the same parts in all figures of the drawing.

Figs. 1 and 2 show the upper part of the engine cylinder 11 with the adjoining portion of the essentially flat bottomed cylinder head 13 and the intermediate gasket 12. The piston 14 is provided in its crown with a troughlike cavity 15 which is preferably flat bottomed and elliptical or nearly elliptical shape and which serves as combustion chamber. The fuel injection nozzle 16 is mounted in the cylinder head 13 with its axis parallel or nearly parallel to the cylinder axis eccentrically thereto more particularly near the outer end of the longer axis of the elliptically shaped troughlike combustion chamber 15 and penetrates with its injector tip 17 so deep into said chamber that the laterally arranged spraying orifices are about halfway between the bottom of the chamber 15 and the bottom of the cylinder head 13 and direct the injected fuel against the mouth 19 of the energy cell 18 which is arranged in the cylinder head 13 diametrically opposite to the nozzle 16. The axes of said cell 18, of said nozzle 16 and of the engine cylinder 11 are situated in a common plane, the axis of the energy cell 18 being inclined toward the axis of the engine cylinder.

In the embodiments illustrated in Figs. 3 and 4 two energy cells are arranged in the cylinder head 13. According to Fig. 3 the axes of said two energy cells 18 are situated in planes symmetrically and parallel to the plane passing through the axis of the injection nozzle 16 and the axis of the engine cylinder 11. According to Fig. 4 the axes of said two energy cells 18 are arranged in intersecting planes symmetrical to the plane passing through the axis of the injection nozzle 16 and the axis of the engine cylinder 11.

Although several embodiments of my invention have been shown and described by way of illustration, it will be well understood that my invention may be otherwise embodied without departing from the principles of my invention.

What I claim as my invention is:

1. An internal combustion engine comprising in combination an engine cylinder; an essentially flat bottomed cylinder head topping said cylinder; an engine piston; a troughlike combustion chamber in the piston crown; an injection nozzle adapted to eject a stream of liquid fuel into the combustion chamber; said nozzle being eccentrically mounted in the cylinder head and reaching with its tip into said combustion chamber; at least one energy cell mounted in the cylinder head diametrically opposite to said nozzle; the axis of said energy cell inclined towards the axis of the engine cylinder with its mouth directed against the tip of said nozzle; said tip of the nozzle provided with lateral spray openings directed against the mouth of the energy cell and situated about equidistantly between the bottom of said troughlike combustion chamber and the bottom of the cylinder head.

2. An internal combustion engine comprising in combination an engine cylinder; an essentially flat bottomed cylinder head topping said cylinder; an engine piston; a troughlike combustion chamber in the piston crown; an injection nozzle adapted to eject a stream of liquid fuel into the combustion chamber; said nozzle being eccentrically mounted in the cylinder head and reaching with its tip into said combustion chamber; two energy cells mounted in the cylinder head diametrically opposite to said nozzle and symmetrically to the plane passing through the axis of the nozzle and the cylinder axis; the axes of said energy cells inclined toward the axis of the engine cylinder with their mouths directed against the tip of said nozzle; said tip of the nozzle provided with lateral spray openings directed against the mouths of the energy cells and situated about equidistantly between the bottom of said troughlike combustion chamber and the bottom of the cylinder head.

3. An internal combustion engine according to claim 2 wherein the said axes of the energy cells are parallel.

4. An internal combustion engine according to claim 2 wherein the said axes of the energy cell are inclined to each other.

References Cited in the file of this patent

UNITED STATES PATENTS

| 2,071,241 | Thomas | Feb. 16, 1937 |
| 2,076,030 | Kahllenberger | Apr. 6, 1937 |

FOREIGN PATENTS

| 315,162 | Great Britain | July 11, 1929 |
| 362,146 | Great Britain | Dec. 3, 1931 |
| 159,752 | Switzerland | Apr. 1, 1933 |
| 421,093 | Great Britain | Dec. 13, 1934 |
| 507,831 | Great Britain | June 21, 1939 |